US010270133B2

(12) United States Patent
Umarov et al.

(10) Patent No.: US 10,270,133 B2
(45) Date of Patent: Apr. 23, 2019

(54) METHOD OF INCREASING SECONDARY POWER SOURCE CAPACITY

(71) Applicant: Solaris Holdings Limited, St. Helier, Jersey, Channel Islands (GB)

(72) Inventors: Georgy Ramasanovich Umarov, Moscow (RU); Sergey Ivanovich Boychenko, Moscow (RU); Shiv Vikram Khemka, Sachseln (CH)

(73) Assignee: SOLARIS HOLDINGS LIMITED, St. Helier, Jersey, Channel Islands (GB)

( * ) Notice: Subject to any disclaimer, the term of this patent is extended or adjusted under 35 U.S.C. 154(b) by 25 days.

(21) Appl. No.: 15/707,244

(22) Filed: Sep. 18, 2017

(65) Prior Publication Data
US 2018/0013172 A1 Jan. 11, 2018

Related U.S. Application Data

(63) Continuation of application No. 14/343,116, filed as application No. PCT/IB2012/001946 on Aug. 28, 2012, now Pat. No. 9,799,923.

(30) Foreign Application Priority Data

Sep. 7, 2011 (GB) .................................. 1115494.5

(51) Int. Cl.
H01M 10/0567 (2010.01)
H01M 10/052 (2010.01)
H01M 10/0525 (2010.01)
H01M 10/08 (2006.01)
H01M 10/34 (2006.01)
H01M 4/587 (2010.01)

(52) U.S. Cl.
CPC ..... *H01M 10/0567* (2013.01); *H01M 10/052* (2013.01); *H01M 10/0525* (2013.01); *H01M 10/08* (2013.01); *H01M 10/345* (2013.01); *H01M 4/587* (2013.01); *H01M 2220/20* (2013.01); *H01M 2220/30* (2013.01); *H01M 2300/0025* (2013.01); *H01M 2300/0082* (2013.01); *Y02E 60/122* (2013.01); *Y02E 60/124* (2013.01); *Y02E 60/126* (2013.01); *Y02P 70/54* (2015.11); *Y02T 10/7011* (2013.01); *Y02T 10/7016* (2013.01)

(58) Field of Classification Search
CPC .......... H01M 10/052; H01M 10/0525; H01M 10/0567; H01M 10/08; H01M 10/345; H01M 2220/20; H01M 2220/30; H01M 2300/0025; H01M 2300/0082; H01M 4/587; Y02E 60/122; Y02E 60/124; Y02E 60/126; Y02P 70/54; Y02T 10/7011; Y02T 10/7016
See application file for complete search history.

(56) References Cited

U.S. PATENT DOCUMENTS

2009/0081518 A1* 3/2009 Miyachi ............. B01D 67/0011
429/490

* cited by examiner

Primary Examiner — Lingwen R Zeng
(74) Attorney, Agent, or Firm — Quarles & Brady LLP

(57) ABSTRACT

A method of increasing secondary power source capacity includes doping a compound into an electrolyte as an additive which binding energy is higher than binding energy of combinations that are formed at a secondary power source discharge, the compound being ZnKr or CdAr. The method can be used in manufacturing secondary power sources such as batteries for electrical machines, transport vehicles, and cars, and for power sources for portable and mobile electronic devices.

6 Claims, No Drawings

METHOD OF INCREASING SECONDARY POWER SOURCE CAPACITY

CROSS-REFERENCE TO RELATED APPLICATIONS

This application is a continuation of U.S. patent application Ser. No. 14/343,116 which was filed Jul. 18, 2014, which represents the national stage entry of PCT International Application No. PCT/IB2012/001946 filed Aug. 28, 2012, which claims priority to Great Britain Patent Application 1115494.5 filed Sep. 7, 2011, the disclosures of which are hereby incorporated by reference in their entirety for all purposes.

TECHNICAL FIELD

The invention relates to electrical engineering and can be used at secondary power source capacity manufacturing: accumulators, storage batteries, and modules, used both in the capacity of power source to machines, electrical vehicles, and other transport vehicles and cargo transports, and for portable and mobile electronic devices.

BACKGROUND ART

At present, secondary power sources are subdivided into a few types, according to materials that used for them, and running chemical reactions.

Secondary power sources (hereinafter also referred to as batteries) run on the principle of a summarized current-generating reaction. Energy is accumulated in a battery under charging from an external power source, because of a chemical reaction under discharge, the energy again directly turns into electrical energy and released to the external circuit. In addition, after the discharge the battery can again be charged by means of backward passage of current.

Following types of batteries are basic and the most used: the lead acid, the nickel-metal-hydride, the lithium-ion, and the lithium-polymeric.

Thus, lead dioxide ($PbO_2$) and lead (Pb) are used as reagents; sulphuric acid solution is an electrolyte in lead batteries. Such batteries are used for supply of major power consumers, including production equipment, starting internal-combustion engines operation, emergency lighting systems, and uninterruptible power systems. Lead acid batteries have low-cost manufacturing and durability. Low specific energy, poor charge preservation, hydrogen loss, impossibility of storage in discharged state, problem with manufacturing of compact batteries should be reckoned among their deficiencies.

In nickel-metal-hydride batteries (Ni-MH), intermetallic semiconductor is an active material of negative electrode, reversibly sorbing hydrogen, i.e. the negative electrode is actually a hydrogen electrode, reduced hydrogen of which has the state of absorption. They're used for portable devices and hardware supply.

In lithium-ion batteries (Li-ion) carbonic material is used as negative electrode, into which lithium ions are reversibly penetrated. Lithium solution in a non-aqueous aprotic solvent is an electrolyte. Batteries have high specific energy, long life, and are able to operate at low temperatures. Due to big capacity, their output dramatically increased, and lithium-ion batteries have become one of the most prospective research trends on battery refinement. That particular type of batteries is used at mobile phones, notebooks, and other portable devices.

Lithium-polymeric batteries (Li-pol) have also become common use, in which carbonic material is used as the plate, into which lithium ions are reversibly penetrated. Vanadium, cobalt, and manganese are active materials for positive electrodes. Either lithium solution in non-aqueous aprotic solvents, enclosed in fine-pored polymeric matrix or a polymer (polyacrylonitrile, polymethyl methacrylate, polyvinylchloride, and others), plasticized by Lithium solution in an aprotic solvent (gel-polymeric electrolyte). Compared to lithium-ion batteries, lithium-polymeric batteries have higher capacity and are also used for portable electronic devices supply.

It should be mentioned that various chemical compositions are devised for electrodes, electrolytes, and membranes, and for every type of batteries. Completeness and speeds of running chemical reactions in batteries are conditioned by such materials, their compositions and structure.

With the lapse of time, major electrical and operational characteristics of batteries are changed because of irreversible processes, running within them, both under operation and at their storage.

The main task of development is improvement of electrical and operational characteristics of batteries.

Generally, ways of the improvement are determined by need for reducing of above mentioned irreversible processes efficiency on them.

Doping to major chemical composition of an electrolyte or an electrode is one of basic ways. Such doping makes it possible to block secondary processes or reduce their influence on major current-generating reactions running.

Thus, electrolyte doping (U.S. Pat. No. 5,962,164, 5 Oct. 1999; U.S. Pat. No. 5,780,183, 14 Jul. 1998; U.S.2003/0228525 A1, 11 Dec. 2003) is proposed to improve operational characteristics of lead-acid batteries. Such doping prevents alterations of electrodes paste, connected with intensive gassing and internal resistance growth at their sulfatation. Certain additives prevent sulfatation, formation of large crystals of lead sulfate that prevent running of reversible current-generating processes in full measure.

Polyacrylamide, an additive to electrolyte, content of which in electrolyte raises viscosity of electrolyte and keeps powdery pastes and resultants on electrodes surfaces (RU2257647, 27 Jul. 2005), is also used for improvement of alkali nickel batteries operational and electrical characteristics.

There's a certain metal-organic additive doped into a lithium-ion battery electrolyte, improving its operation stability and increasing the number of charge/discharge cycles (U.S. Pat. No. 7,217,477, 15 May 2007). The metal-organic additive makes it possible to escape excess voltage on electrodes, using insulating layer formation on cathode surface. The surface of a cathode active material is controlled by the additive; otherwise, side reactions with the electrolyte run on it. There are certain additives of carbonate type, doped into the lithium-ion battery electrolyte composition, making possible increasing the number of charge/discharge cycles and providing a battery operation both at room and lowered temperatures (EP1215746, 19 Jun. 2002).

Essentially, the purpose of above mentioned doping is to make it possible to run the current-generating reaction in full measure. Such additives can make possible batteries operation with characteristics that are extreme to their operating components materials (electrolyte and electrodes), and support the batteries operation under conditions, regulated by the types of batteries.

DISCLOSURE OF INVENTION

Secondary power source capacity increasing generally stipulated by materials of its constructs, charge time reduction, and life time increase, is a technical result, this invention is intended at.

The specified result is achieved by means of the method of secondary power source capacity increasing including doping a compound into an electrolyte as an additive which binding energy is higher than binding energy of combinations that are formed at a secondary power source discharge, the compound of type $A_N B_{10-N}$ is doped as an additive, where A is a metal and B is a noble gas.

In a particular case a compound of type $A_2 B_6$ is doped as a catalytic additive in nano-quantity, the molecular structure of which matches the molecular structure of the additive of type $A_N B_{10-N}$.

In a particular case the method including an impact on an electrolyte with electrostatic field, moreover, the vector of the electrostatic field is parallel to the vector of a charge discharge current, and the intensity rate is set and supported in the range from 1.000 to 70.000V/cm.

In a particular case the method including a voltage pulse impact on an electrolyte, the amplitude of which exceeds the value of energetic barrier width of current-generating chemical reaction, the duration exceeds energetic barrier width of current-generating chemical reaction, and the pulse-repetition interval is less or equal to relaxation time of this reaction.

The investigation, carried out by the authors since 1970 s and concerning double and triple connections of intermetallic semiconductors, their structure, properties, and methods of their synthesis, is taken as a basis of the applied invention. Descriptions and the results of the investigation are written in the following works: "Characteristic Features of the Electronic Spectrum and the Stability of Ternary Diamond-Like Semiconductors". Phys. Stat. Sol. (b) 90, p. 733-740, 1978, A. M. Altshuler, Yu. Kh. Vekilov and G. R. Umarov "The stability of the inert A2138 compounds". Phys. Lett. A, 73, No. 3, p. 216-217, 1979, A. M. Altshuler, Yu. Kh. Vekilov and G. R. Umarov. Such characteristics of the specified connections, as binding energy, the features of the crystal structure, symmetry, the impact of adding those compositions on mobility of ions at electrolyte. The results of investigation and laboratory research made it possible to find a technical solution intended to achievement of the above mentioned technical result.

To get to the heart of the applied method, scientific information is specified below, including that derived from the works, in which the authors of the invention participated.

Current in electrolyte is a moving of positive and negative ions in opposite directions, because of an electrochemical reaction, running within it. Therewith, formation and electrochemical bindings and ruptures run with energy release and absorption, respectively. As a rule, the energy is generally used at power sources.

Chemical combinations have a binding energy, as known of physical chemistry. The binding energy is a difference between dull energy of the bound state of a combination as a system of particles and energy of state in which the particles are infinitely far from each other and solid-state.

A number of compounds, possessing high binding energy, is marked out and studied by the authors of the invention within the bounds of the above mentioned investigation. On the assumption of the fact that the higher binding energy, the higher energy released at a composition formation, a possibility of activation of combination reactions and dissociation of mentioned combinations, in parallel with major current-generating reactions, to use an energy released under the formation of those combinations, to increase a battery capacity, is proven by the authors of the invention.

As you know, the quantum-mechanical mechanism of phase transformations has big practical importance to phase transitions, particularly under electrical chemical reactions. Examination of the picture of valence electrons and ions movement under first-kind phase transitions and quantum-mechanical accounts of real agents' energetic spectra made it possible to precisely show certain classes of agents and the specific process flow which, in aggregate, made it possible to achieve considerable improvement of consumer characteristic of the final product, in this case, secondary power source capacity increasing.

The start point is based on a number of published works in which the authors of this invention participated, including, except the above-mentioned, "Pressure impact on electronic structure of semiconductors", G. P. Umarov, V. I. Kozlov, and A. A. Firsanov, High-pressure physics and engineering, rel. 23-1986—p. 9-13, and "The first-kind phase transition mechanisms in metals and semiconductors under influence of an electrostatic field", G. R. Umarov, High-pressure physics and engineering, rel. 33-1990—p. 10-14. They affirm that first-kind phase transitions start on lines of parent phase absolute fluctuation. Such a fluctuation is a thermodynamic characteristic of the phase system and, in turn, directly connected with degeneration at the energetic spectrum of the system at the quantized level, where the levels, occupied with valent quasi-electrons, have the same value, as energy levels that free of those quasi-particles. That means that the valence band top in the central point of Brillouin zone for investigated combinations is found at the bottom level of a valent conduction zone in medium points of the Brillouin zone border. Thus, it's obvious that not just the energy conservation law plays an important part, but also the momentum conservation law directly connecting the internal symmetry of the start phase with the end phase symmetry through the quasi-momentum symmetry between degenerated levels in real energetic spectra. ("The solution to many-body problems", G. P. Umarov and F. F. Firsanov, Rasplavi USSR Academy of Sciences.—1990. 3—pp. 25-31).

The results of the investigation preceded the invention changed understanding of a number of processes essence and guided the authors to the idea of possibility to use the results at effective range to solve problems with enhancement of secondary power sources. Analysis of the investigation results made it possible to directly enter experimental design and designs manufacturing.

The authors as well managed to prove the theorem of a control structure, or a subsystem, existence that realizes a phase transition. It is proven that there cannot be another mechanism of ions and quasi-electrons movement at condensed medium.

For amorphous bodies and liquids that in most cases are electrolytes in storage batteries, starting internal symmetry is described by means of structure factor expansion in a generalized Fourier series. In such a case, deviations from the ideal starting structure are the control structure. Averaged structure factor at the ideal structure contains no uneven degree to ions deviations of balances. In particular, that means to the crystalline solid that a phase transition is impossible in an ideal defect-free crystal, free from contamination. In the last case, the role of the control structure is performed either by vacancies, or by dislocations, or by chemical impurities, or by all these factors, depending on their relative concentration and polarizability of their small hydrogen-like levels, weakly binding charge carriers—quasi-electrons and ionic complexes.

It's well known that a battery capacity determined with physical-chemical processes under electrochemical reactions at charging and discharging the battery, directly connected with a quantity and concentration of quasi-free charge carriers, as well as their mobility. Therefore, it's possible to dramatically increase a quantity of charges in electrolyte, using combinations (compounds) as an additive to electrolyte with binding energy which is higher than binding energy of combinations (compounds) generated at discharge of a battery. For such combinations eight valent electrons and a contingent of positively charged ions fit a base unit. Binding energy of such combinations, as well as valence bands depth and exclusion bands width that strongly correlates to binding energy, is much higher than, for example, at combinations generated at discharge of a battery (e.g. lead sulphides that have all the specified characteristics more than twice worse).

Within electrolytes at batteries of the existing types, an irregularity of charges density is occurred, relative to an average quantity, and there're complexes with a powerful intrinsic charge. Such complexes, at which an electric charge considerably exceeds a medium charge of ions and complexes located within electrolyte, having both positive and negative charge, become a nucleus of a new phase and play the role of the control structure for phase transitions running. Therewith, the symmetry of the charge configuration in such nuclei-complexes of the new phase contains symmetry elements of the new phase. Thus, a sharp polarization of charge carriers within electrolyte provides dissolution of a combination in it—high binding energy additives, at which a part of the binding energy is released, and additive charge carriers are disengaged. The phase transitions, running within the electrolyte, cause energy storage and the battery capacity increase stipulated by materials of its constructs.

During the experimentation related to influence of dopes from the range of compounds with a certain binding energy on secondary power sources characteristics it is found that it's possible to achieve an additional increase of charge carrier's mobility within electrolyte which makes it possible to intensify the process of dope dissolution, release of a part of the binding energy, and additional charges release. The problem might be solved in several ways, including their combined use.

It should be noted that control structure concentration, enough for nucleation of a new phase, is 5-10 degrees less than the great bulk of a substance. In addition, considering that, for example, the steady-state concentration of vacancies, playing the role of the control structure within a solid body, is, as is known, $10^{15}$-$10^{17}$ per 1 $cm^3$, as the base material is Avogadro number N=$6*10^{24}$ base units per 1 $cm^3$, correctly selected additives in "homeopathic", or rather, nano-quantites, can change the speed, but often can also change the end result of a phase transition within the major dope. It is found that the molecular structure of such catalytic dope should match the molecular structure of the major dope. So, catalytic dopes were experimentally selected—also compounds of type $A_2B_6$,—which dramatically intensify the described above processes within electrolyte. Such a catalytic dope initializes processes in an electrolyte, running by the same mechanism, as the processes activated with the major dope, but has less energy than the binding energy of the major dope. However, polarizability of the catalytic dope combination is high, and it activates the polarizability of the major dope. It enables more intensive and easy running of dissolution and generation of new phase nuclei, the catalytic dope plays the role of a catalyst that decreases the energy barrier of running phase transitions activated with the major dope.

It is experimentally found that it's possible to achieve an additional mobility increase of charge carriers within an electrolyte, organizing an electrostatic field or high-voltage pulses impact during charge and/or discharge of a battery.

Whereas complexes with a charge, markedly differ from an average one, are nuclei of a new phase, an impact on an electrolyte with an external electrostatic field or short high-voltage pulses dramatically changes the activity of charging centers; in addition, the speed grows, energy barrier of running phase transitions decreases, and the dopes diffusion process within is the electrolyte is activated. Thus, the impact on an electrolyte with an external electrostatic field or short high-voltage pulses is identical to the impact of a catalytic dope.

The above mentioned impact is realized as follows. An electrostatic field is laid over the electrolyte in such a way that the vector of its electric field is parallel to the vector of a charge discharge current of a battery, and the intensity rate is set and supported in the range from 1.000 to 70.000V/cm, depending on specific combination of the major doping to the electrolyte. Specific intensity rates in the above mentioned range are experimentally selected to different types of dopes. Electrostatic field might be generated, for example, by means of voltage supply on a separate isolated and specifically oriented electrode by electrical circuit galvanically disconnected from the battery charge/discharge circuit, and the required voltage for ensuring the specified intensity is received by multiplication of the voltage on the battery electrodes, according to the known schemas.

It is also experimentally found that the impact on an electrolyte with high-voltage pulses with a certain amplitude, duration, and porosity leads to resonance with control structures and additional charging centers release enables increase of control structure concentration. Such centers absorb electromagnetic field energy, if the value of the energy matches the differential between two energy levels of such a charging center. In addition, higher energy of the charging center means its bigger impact on a phase transition. Prevention of destructive diffusion processes within a battery that appear because of an ion barrier formation near electrodes, the electrolyte internal resistance and the temperature increase, is an additional effect, arising at the above mentioned impact.

An impact pulse can be generated by means of known schemas of high-voltage low-current pulse formers, both, at charge and discharge of any type battery. Pulses amplitude is selected to exceed the value of energy barrier $\Delta E$ of an electrical chemistry current formation reaction and only limited with electric strength of constructs; duration of pulses is selected to exceed the value of energy barrier determined as $\Delta\tau \sim h/\Delta E$, where h is Planck constant, and the pulse-repetition interval doesn't exceed the relaxation tome of the above mentioned reaction.

The types of combinations (compounds) and specific dopes structures exert an effective influence on the structure that controls electrochemical processes, had been initially rated theoretically. Hereafter, the combinations of the dopes were experimentally refined, and their optimal concentration within electrolyte was determined.

MODES FOR CARRYING OUT THE INVENTION

The examples of realization of the stated method of secondary power source capacity increasing are given below. Moreover, the comparative electrical and operational characteristics of lithium-ion batteries (standard battery and batteries which were manufactured under the claimed method) are given in table.

EXAMPLE 1

The following compounds were doped for a standard lithium-ion battery (the positive electrode is carbonic, the negative electrode is made of lithium oxide and manganese):
ZnKr (average exclusion bands width of which is $E_{g\ min}$~5.4 eV, binding energy is Ec~1.293 Ry/atom);
CdAr ($E_{g\ min}$~5.2 eV, E.sub.e.about.1.281 Ry/atom);
The doping was added to an electrolyte (up to 8% of the electrolyte volume) at the battery manufacturing which dissolved within the electrolyte. The battery is connected to a consumer after the charge of the battery was made. At power supply it's found that released charge carriers at the doping dissolution enable 80% growth of the battery capacity.

EXAMPLE 2

Compound ZnKr was doped into an electrolyte at lithium-ion battery manufacturing (binding energy $E_c$~5.4 Ry/atom). With that, an additive electrode that is isolated of the electrolyte and working electrodes, was placed into the battery design, with respect to which an electrostatic field with up to 70.000V intensity was generated. For that, voltage applied on the electrode by electrical circuit galvanically disconnected from the battery major current circuit. The voltage-multiplying circuit of the battery to the required value was made as a single unit constructively coupled with the battery and connected to its schemas. As a result, the capacity of the battery was approximately multiplied by 1.8.

EXAMPLE 3

Compound ZnKr was doped into an electrolyte at lithium-ion battery manufacturing (binding energy $E_c$~5.4 Ry/atom). With that, a high-voltage low-current pulses former was added into the battery design, manufactured as a single unit; the pulses had the following characteristics: durability is 100 ns, pulse-repetition interval is 80 ns, and amplitude is 1.500V. The outlet of the unit is connected to terminals of the battery. About 90% increase of the battery capacity is the result.

Thus, as seen from the above mentioned information, doping into an electrolyte the certain additives and additional impact on received combination at charging and discharging, according to this invention makes it possible to considerably increase capacity of a secondary power source, reduce charging time, and a number of charge discharge cycles, i.e. extend life time of a battery.

The examples given in the description, illustrate preferable variants of the announced method realization, however, different realizations are possible without a deviation of the invention essence within the scope of the proposed formula.

INDUSTRIAL APPLICABILITY

Experimental models of a few types of batteries were designed under way of the announced method. Such batteries can be extensively used as autonomous power sources for electrical machines, transport vehicles, particularly, electric vehicles, and as a battery to portable and mobile electronic devices.

TABLE 1

The spread sheet of lithium-ion secondary power source electrical and operational characteristics.

| Electrical and operational characteristics of battery | Lithium-ion battery | | | |
| --- | --- | --- | --- | --- |
| | Standard: Positive electrode is made of carbon, negative electrode is made of lithium oxide and magnanese | with a major additive in electrolyte ZnKr | with a major additive in electrolyte ZnKr and organized additional impact with high-voltage pulses (example 5) | with a major additive in electrolyte ZnKr and organized additional impact with external electrostatic field |
| Energy density, W * hr/kg | 110-160 | 180-300 | 160-190 | 210-350 |
| Internal resistance, mW | 150-250 | 170-260 | 140-180 | 140-240 |
| Number of charge/discharge cycles till 20%-capacity loss | 500-1000 | 500-1000 | 600-1300 | 600-1500 |
| Charge rate, hr | 2-4 | 2-3 | 0.1-2 | 0.1-2 |
| Discharge dependence | very low | very low | very low | very low |
| Local action, %, a month (room temperature) | 10 | 10 | 10 | 10 |
| Rated voltage, V | 3.6 | 3.7 | 3.8 | 3.8 |
| Load current, relating to capacity C: peak the most adoptable | >2 C 1 C and below | >2 C 0.8-1.0 C | >2 C 0.7-1.1 C | >2 C 0.7-1.1 C |
| Operating temperature range, ° C. | −20 +60 | −20 +60 | −20 +60 | −20 +60 |

The invention claimed is:

1. An electrolyte for a secondary power source, the electrolyte being doped with a compound which is ZnKr or CdAr.

2. The electrolyte according to claim 1, the electrolyte being lithium solution in a non-aqueous aprotic solvent.

3. A secondary power source comprising an electrolyte as defined in claim 1.

4. The secondary power source according to claim 3, wherein the secondary power source is a battery.

5. The secondary power source according to claim 4, wherein the battery is a lithium ion battery.

6. An electrical machine, transport vehicle, electric vehicle, portable electronic device or mobile electronic device comprising a battery as defined in claim 4.

* * * * *

UNITED STATES PATENT AND TRADEMARK OFFICE
CERTIFICATE OF CORRECTION

PATENT NO. : 10,270,133 B2
APPLICATION NO. : 15/707244
DATED : April 23, 2019
INVENTOR(S) : Gregory Ramasanovich Umarov et al.

It is certified that error appears in the above-identified patent and that said Letters Patent is hereby corrected as shown below:

In the Specification

Column 3, Line 39, "A2138" should read --$A_2B_8$--.

Column 7, Line 13, "E.sub.e.about." should read --$E_c$ ~--.

Signed and Sealed this
Eighteenth Day of June, 2019

Andrei Iancu
*Director of the United States Patent and Trademark Office*